US009616331B1

(12) United States Patent
Jordan

(10) Patent No.: US 9,616,331 B1
(45) Date of Patent: Apr. 11, 2017

(54) GAMING MACHINE TOURNAMENT MANAGEMENT SYSTEM

(71) Applicant: Jordan Gaming Consulting Group, LLC, Las Vegas, NV (US)

(72) Inventor: Richard Jeffrey Jordan, Las Vegas, NV (US)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 0 days.

(21) Appl. No.: 13/952,158

(22) Filed: Jul. 26, 2013

Related U.S. Application Data

(60) Provisional application No. 61/678,524, filed on Aug. 1, 2012.

(51) Int. Cl.
*A63F 9/24* (2006.01)
*A63F 13/30* (2014.01)
*G07F 17/32* (2006.01)

(52) U.S. Cl.
CPC .......... *A63F 13/12* (2013.01); *G07F 17/3276* (2013.01)

(58) Field of Classification Search
CPC ............. G07F 17/3255; G07F 17/3276; G07F 17/3202; G07F 17/3223; A63F 13/30
USPC ............... 463/16–22, 40–43; 273/138.1, 139
See application file for complete search history.

(56) References Cited

U.S. PATENT DOCUMENTS

| | | | | |
|---|---|---|---|---|
| 6,039,648 | A | 3/2000 | Guinn et al. | |
| 6,135,884 | A | 10/2000 | Hedrick et al. | |
| 6,293,866 | B1 | 9/2001 | Walker et al. | |
| 6,908,390 | B2 * | 6/2005 | Nguyen et al. | 463/42 |
| 8,357,034 | B2 | 1/2013 | Smith et al. | |
| 8,376,831 | B2 | 2/2013 | Hedrick et al. | |
| RE44,295 | E | 6/2013 | Hedrick et al. | |
| 8,500,542 | B2 * | 8/2013 | Baerlocher et al. | 463/20 |
| 8,662,985 | B2 | 3/2014 | Johnson | |
| 8,678,912 | B2 | 3/2014 | Hedrick et al. | |
| 8,758,109 | B2 * | 6/2014 | Lutnick | G07F 17/32 273/292 |
| 8,876,608 | B2 | 11/2014 | Shepherd et al. | |
| 9,070,255 | B2 | 6/2015 | Christensen | |
| 2002/0042296 | A1 | 4/2002 | Walker et al. | |
| 2004/0092303 | A1 | 5/2004 | George et al. | |
| 2004/0106446 | A1 | 6/2004 | Cannon et al. | |
| 2006/0178202 | A1 | 8/2006 | Hughes et al. | |
| 2007/0004508 | A1 * | 1/2007 | Walker et al. | 463/29 |
| 2007/0077988 | A1 * | 4/2007 | Friedman | 463/25 |
| 2007/0167226 | A1 * | 7/2007 | Kelly et al. | 463/29 |
| 2008/0076496 | A1 * | 3/2008 | Baerlocher et al. | 463/1 |
| 2008/0076571 | A1 | 3/2008 | Frerking | |
| 2009/0005150 | A1 | 1/2009 | Haveson | |
| 2009/0131156 | A1 | 5/2009 | Acres | |
| 2009/0191962 | A1 * | 7/2009 | Hardy et al. | 463/29 |

(Continued)

*Primary Examiner* — Jay Liddle
*Assistant Examiner* — Alex F. R. P. Rada, II
(74) *Attorney, Agent, or Firm* — Armstrong Teasdale LLP

(57) ABSTRACT

A system and method of managing a gaming machine tournament, such as a slot tournament, are described that include organizing a gaming machine tournament that takes place on a set of gaming machines where each gaming machine has an interface into a tournament management system. The tournament game play parameters are configured using the tournament management system. Perks are provided to players, where the perks can be redeemed during tournament play and provide the player an advantage in the tournament play.

20 Claims, 6 Drawing Sheets

(56) References Cited

U.S. PATENT DOCUMENTS

| | | | | |
|---|---|---|---|---|
| 2010/0081497 | A1* | 4/2010 | Wolf et al. | 463/25 |
| 2010/0137052 | A1 | 6/2010 | Bennett et al. | |
| 2011/0065490 | A1* | 3/2011 | Lutnick | G07F 17/32<br>463/16 |
| 2012/0083908 | A1* | 4/2012 | Carpenter et al. | 700/91 |
| 2013/0084939 | A1* | 4/2013 | Nicely | 463/20 |
| 2013/0084952 | A1* | 4/2013 | Nicely | 463/25 |
| 2013/0084953 | A1* | 4/2013 | Nicely | 463/25 |
| 2013/0084954 | A1* | 4/2013 | Nicely | 463/25 |
| 2013/0084988 | A1* | 4/2013 | Nicely | 463/42 |
| 2013/0084989 | A1* | 4/2013 | Nicely | 463/42 |
| 2013/0084990 | A1* | 4/2013 | Nicely | 463/42 |
| 2013/0331181 | A1* | 12/2013 | Newton et al. | 463/29 |
| 2013/0331192 | A1* | 12/2013 | Betti et al. | 463/42 |
| 2013/0331968 | A1* | 12/2013 | Newton et al. | 700/92 |
| 2014/0228098 | A1* | 8/2014 | Englman et al. | 463/25 |

* cited by examiner

GAMING MACHINE TOURNAMENT MANAGEMENT SYSTEM

CROSS REFERENCE TO RELATED INFORMATION

This application claims the benefit of U.S. Provisional Patent Application No. 61/678,524, filed Aug. 1, 2012, the contents of which are hereby incorporated herein in its entirety.

TECHNICAL FIELD

The present disclosure is directed to management of slot machine tournaments.

BACKGROUND OF THE INVENTION

Slot tournaments are very popular with casino patrons, however, they can be difficult to implement for the casinos. Each player must be registered and tracked throughout the tournament. The registration and record keeping can be done by hand, which is time and resource consuming for the casino, or may include some automation through a slot tournament application. Without a direct connection with the slot machines, however, real-time tracking of the standings is not possible or very difficult to implement. What is needed is a mechanism to interface with the slot machines in real-time and a centralized player game management system to track each player.

Also, it would be advantageous to have a system to allow players to earn rewards or perks that can be used in tournament play. These perks could preferably be earned by play at a casino using the casino's loyalty account. Such a program would incent players with loyalty accounts to play in the tournaments and would incent tournament players to play outside the tournament to win perks redeemable in the tournament settings.

BRIEF SUMMARY OF THE INVENTION

In a preferred embodiment, a gaming machine tournament management system is described. The tournament management system includes a hardware interface in each of a set of gaming machines to be used in a tournament. A content delivery system connects to the set of gaming machines and delivers content to the gaming machine through the hardware interface. A player game management system connects to the set of gaming machines through the associated hardware interface, and tracks the activity at the slot machine, so that the player game management system can display the activity across the plurality of gaming machines. The content delivery system and player game management system provide one or more players with perks and allow the player to redeem the perks during tournament play, the perks providing the player an advantage in the tournament play.

In another preferred embodiment a method of managing a gaming machine tournament, such as a slot tournament, is described. The method includes organizing the gaming machine tournament, where the gaming machine tournament takes place on a set of gaming machines, each of the set of gaming machines having an interface into a tournament management system. Tournament parameters are configured using the tournament management system. One or more players are provided with perks usable during tournament play where the players are allowed to redeem the perks during tournament play, thereby providing the player an advantage in the tournament play The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

According to the concepts described herein a system for managing, configuring and organizing slot tournaments is described that incorporates an interface into a group of slot machines to be used in the tournament. While the system is described with respect to slot machines and slot tournaments, the concepts described herein are applicable to all types of gaming machines and other digital gaming content. The system allows tournament organizers to set tournament name, dates, and overall rule structure by allowing configuration of entry status, the number of sessions, the length of the sessions, number of players allowed and payout structure for placement at the end of a tourney. The system also allows for tournament perks which players earn on participating slot machines that can enhance their chances during a tournament.

Figure 1:
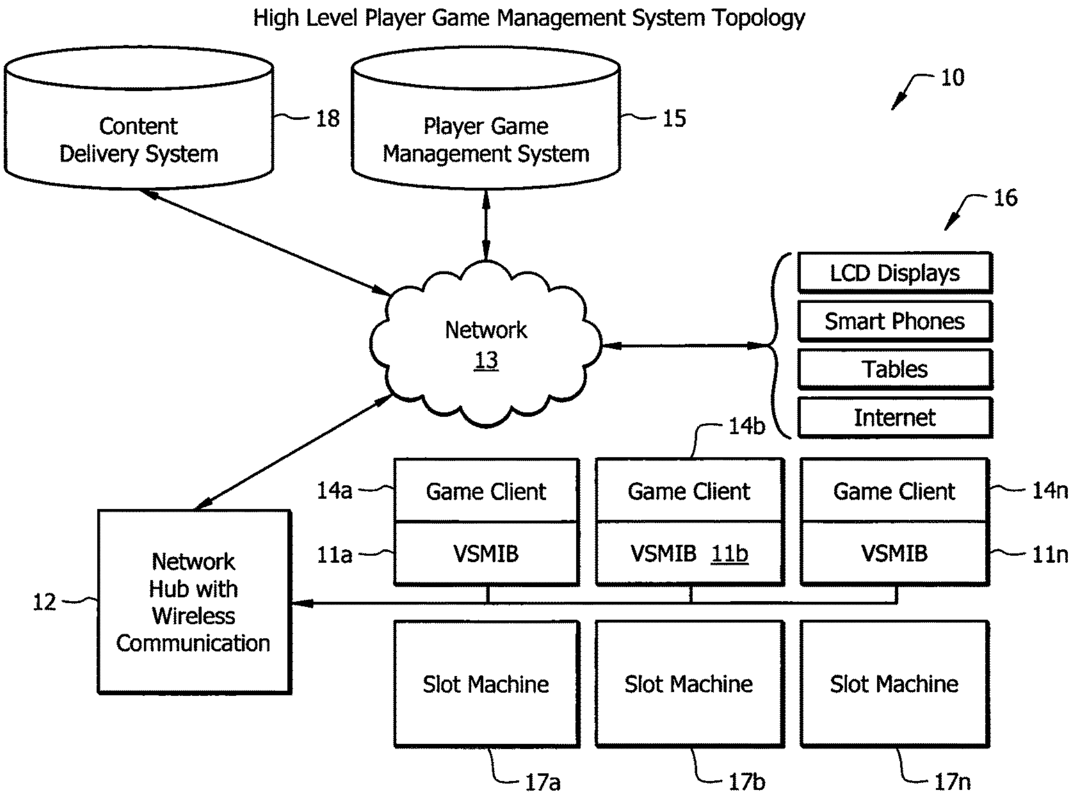
FIG. 1 is a block diagram of an embodiment of a slot tournament management system topology according to the concepts described herein.

Referring now to FIG. 1, an embodiment of a player game management system 10 topology is shown. Video Slot Machine Interface Board (VSMIB) hardware 11*a*, 11*b* . . . 11*n* connects to the gaming device 17*a*, 17*b* . . . 17*n*, which can be a slot machine, either through the 2$^{nd}$ slot accounting system (SAS) port or by splitting the SAS port. The VSMIB connects to all legacy and new I/O devices such as ticket printer, bill validator, card reader, and video screens. The VSMIB hardware allows communication to and from the slot machine to external networks and also the video display of the slot machine to be controlled or shared by an external process from the slot machine hardware. Using the VSMIB hardware, each gaming machine 17*a*, 17*b* . . . 17*n* is connected to a network hub 12 with a wireless or Ethernet network connectivity. The high bandwidth network connects a Content Delivery System 18 to the network slot machines enabling content delivery, including loading external game content that can be used in a tournament environment.

Using the Content Delivery System 18, Game Client 14*a*, 14*b* . . . 14*n* is downloaded to the VSMIB hardware or slot machine. It contains the executable necessary to deliver game content to the slot machine via the VSMIB hardware device. Content can be any suitable protocol, including Flash, HTML, or QML based. Player Game Management system 15 tracks activity that occurs at the slot machine based on players interface with the game client 14*a*, 14*b* . . . 14*n*. Information tracked can include loyalty card number, alias name, and other patron identifiers, such as player bets, wins, losses, and game outcomes. Game outcomes can include a video image of the game outcome. Image can be generated by the game client or captured by the VSMIB. Game outcomes in terms of scores or events can also be tracked by the Player Management System 15. As the real time information on each player in the tournament is being collected by the Player Management System, that information can be shared in real time with the tournament staff and players. Displaying the player's progress in a tournament, for example, could occur on LCD displays, smart phones, tablets, or on the internet. This provides the player excitement at the casino during the tournament session and a means to stay engaged via other digital distribution systems over time.

Figure 2:
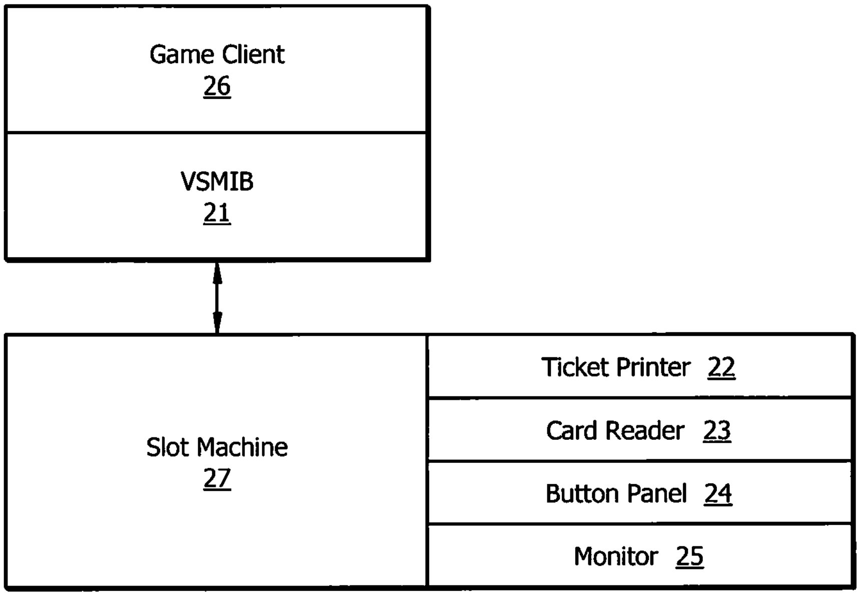
FIG. 2 is a block diagram of an embodiment of a gaming machine and interface according to the concepts described herein.

Referring now to FIG. 2, an embodiment of the connection and interaction between the VSMIB hardware and the gaming machine and its components is shown. VSMIB hardware 21 connects to the gaming device 27, either through a 2$^{nd}$ SAS port or by splitting the SAS port to allow connection of the VSMIB hardware. Individual gaming machines 27 are daisy chained together. VSMIB hardware 21 also connects to the 2$^{nd}$ port on a ticket printer 22 and allows the system to utilize print functions to print registrations, players scores and session information. VSMIB hardware 21 also connects to the card reader 23 and is capable of reading the player account number on the player's casino loyalty card. With this connectivity the player management system can track play and create tourney qualifier rules, and on the backend, connect player activity with demographic and behavioral player data. VSMIB hardware 21 can be used to drive the button panel 24. This allows for the Game Client 26 to utilize existing button panels to interface with player and receive information.

VSMIB hardware 21 can drive the game monitor 25. Utilizing the alpha blend, or similar technology, of the video feed to the game machine's monitor 25, board messages can be presented to the player during the normal play on the game. Message information to the player regarding tournament entry, registration, status, achievements, and other information can be presented to the player in real time. As described above with reference to FIG. 1, Game Client 26 is downloaded from the Content Delivery System server. It contains the executable necessary to deliver game content to the slot machine via the VSMIB hardware device 21. Content for the Game Client can be any suitable protocol, such as Flash, HTML, or QML based.

Using a tournament system incorporating a player game management system as described herein allows any type of gaming machine tournament to be run with almost any characteristic desired by the casino. By way of example only, an embodiment of a tournament is described.

The tournament could be a standard slot tournament utilizing a Game Client that is a standard 9 line 45 coin video slot with quality spin animations. Other variations of tournaments could include multiple slot games where the player unlocks various games as they progress through the tournament structure or plays a certain number of tournaments. While this embodiment is focused on a traditional reel or video slot game mechanism, certainly other manifestation could apply, such as a video poker or black jack to name a few. Since the application is a tournament with fixed payouts based on entries or other criteria, a 150% payback type game math can be used to add to the excitement of the tournament. The payback frequency is configurable, but usually has a positive payback in order to drive high scores within the tournament. High hit frequency and high volatility of jackpots make players feel that they are doing well. In a tournament application, game spins need to be quicker than usual and credit roll up faster. The system also preferably allows the casino to publish game score and events in real time. The casino can publish the scores to digital devices, such as other slot machines, signs, smart phones, cell phones, tablets, and web portals to name a few. Player achievements in and out of the game can also be included in the game design.

From the server or player game management system side of the tournament, the system needs to track the score as it changes in real time from the game client. The system can then publish the client scores and relative position visa-vie others (tournament rank) in real time during the session. The system also preferably publishes the standing at the end of the session or as multiple session events occur, and tracks individual game outcomes during the session, such as the top jackpot hitting. The system can be configured to report the events in real-time and to track and display player activity at all participating games using the VSMIB hardware.

From a tournament configuration perspective, the system allows the tournament organizers to set tournament name, dates, and overall rule structure. The system also configures entry status, such as based on pre-selection, making a payment, or earning points. The system configures the number of sessions, the length of the sessions, number of players allowed and payout structure for placement at the end of a tourney, and sets up tournament perks which players earn on participating slot machines that can enhance their chances during a tournament. Teams can be system selected or automatically selected.

Figure 3:
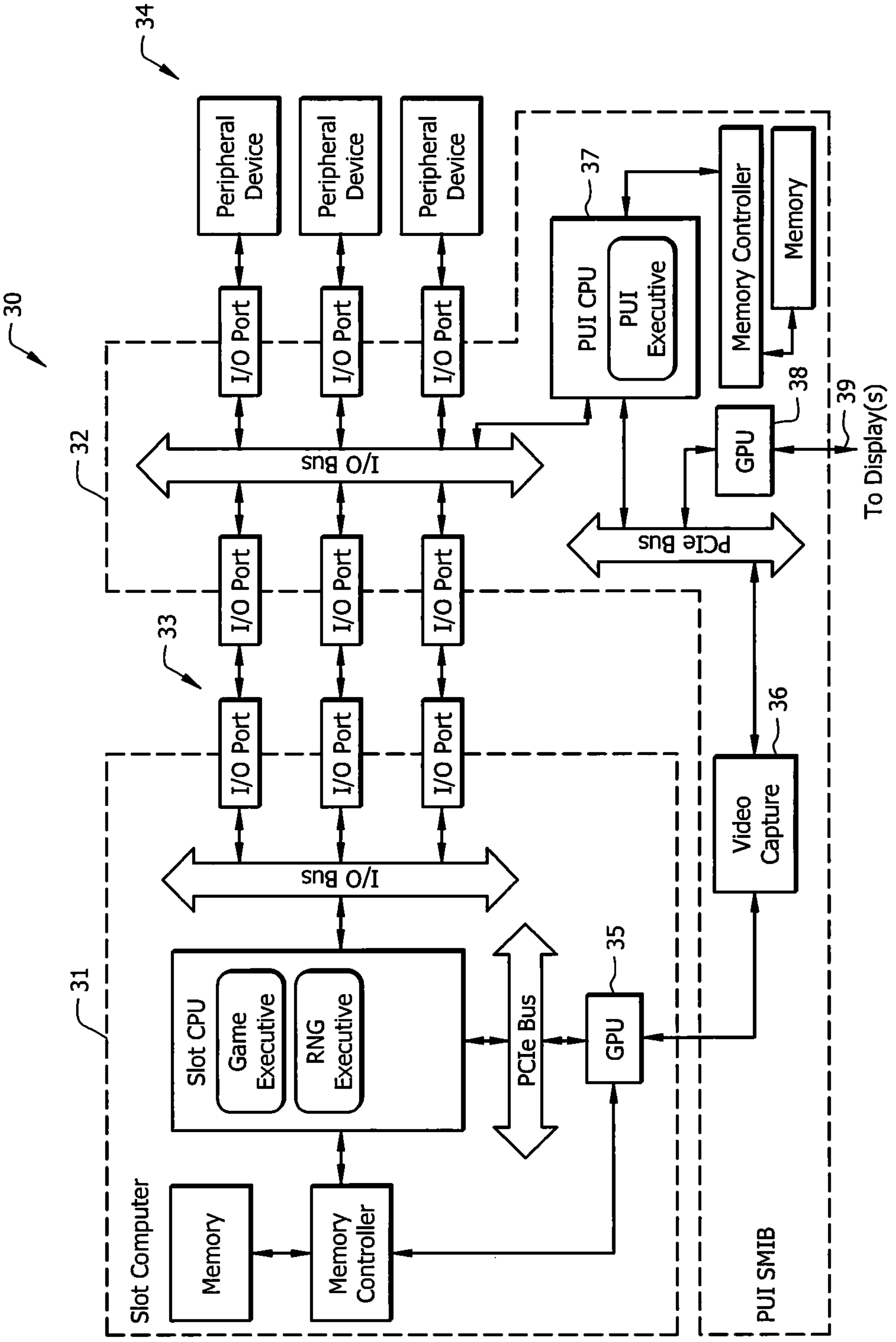
FIG. 3 is a block diagram of an alternate embodiment of a gaming machine and interface for implementing the concepts described herein.

Referring now to FIG. 3, another embodiment of a VSMIB and slot interface is shown. System 30 includes slot computer 31, player user interface (PUI) VSMIB 32 and peripheral devices 34. The VSMIB 32 in this embodiment is connected both to the graphics processor 35 of the slot computer 31 through video capture circuit 36 on VSMIB 32, and to the I/O interfaces 33. VSMIB 32 passes the I/O information from slot computer 31 to the appropriate peripheral devices, but also provides the processor 37 of the VSMIB 32 with the ability to intercept and modify the I/O communications of the slot computer. Peripherals can include ticket printers, card readers, button panels, monitors or other slot machine interfaces.

Graphics from the graphics processor 35 of slot computer 31 are intercepted by the VSMIB 32. This allows the microprocessor 37 of the VSMIB to provide overlay graphics, windows, picture-in-picture or other graphic information and interfaces to the slot video information. This content is preferably related to the slot tournament and can include information around perks or the status of the slot tournament, including leader boards, time remaining and other pertinent information. Once the content has been added to the slot video, the graphics processor 38 of the VSMIB 32 sends that information to the slot machine display.

Figure 4:
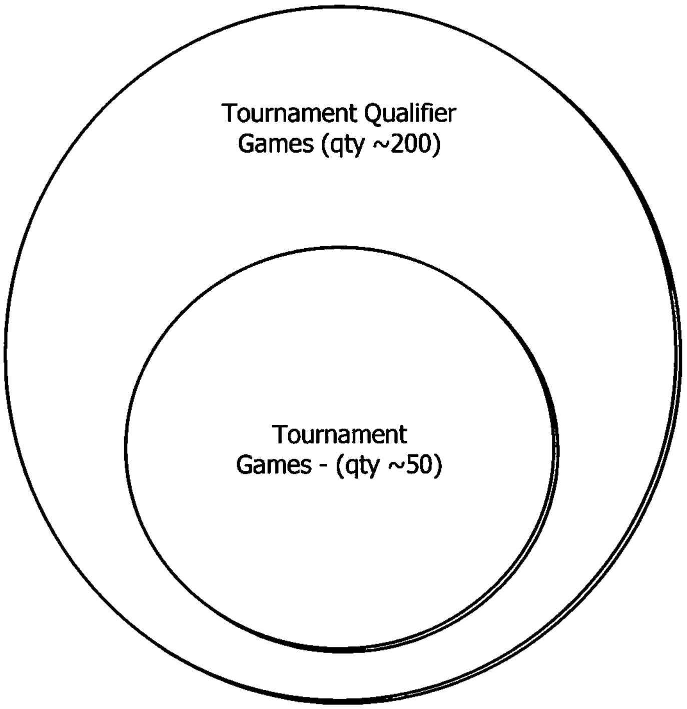
FIG. 4 is a diagram showing a possible structure for a slot tournament according to the concepts described herein.

Referring now to FIG. 4, players can earn tournament entries and tournament perks based on certain number of points earned at qualifying games. Players play the tournament on a limited number of games. Additional promotional applications can be layered on the existing install base over time. Applications can come from the player management system or from other 3$^{rd}$ parties.

A Leader Board can be implemented by the player management system to show a presentation to the player of the game outcomes during and after the tournament session, and to post the highest session score and ranking among all sessions. Players' scores can be totaled and ranked. The more they participate the higher their score. Tracking hits on various jackpots, such as the top jackpot, will allow for the creation of additional achievements. These additional achievements can be used to award additional tournament entries and perks.

The system described herein can also be used to facilitate tournament login and the customer payout process. For the tournament login the VSMIB hardware can read the unique identifier of the player's card inserted into the card reader. During login or registration for the tournament, the player can associate a password, an alias, and an email address to the unique identifier of the player's card. Players can use their email address and password to access content during a session via the internet, smart phone, or tablet applications.

With regard to the customer payout process, the customer database can capture the full name, address, and social security number for the customer. This information can be gathered via data entry during the payout of a tournament or via a read only interface to the Casino Management System. First phase is data entry by a tournament clerk. The information will be used to produce taxable reporting forms that need to be signed prior to payout. The system will need to prepare and print this paperwork based on results.

Figure 5:
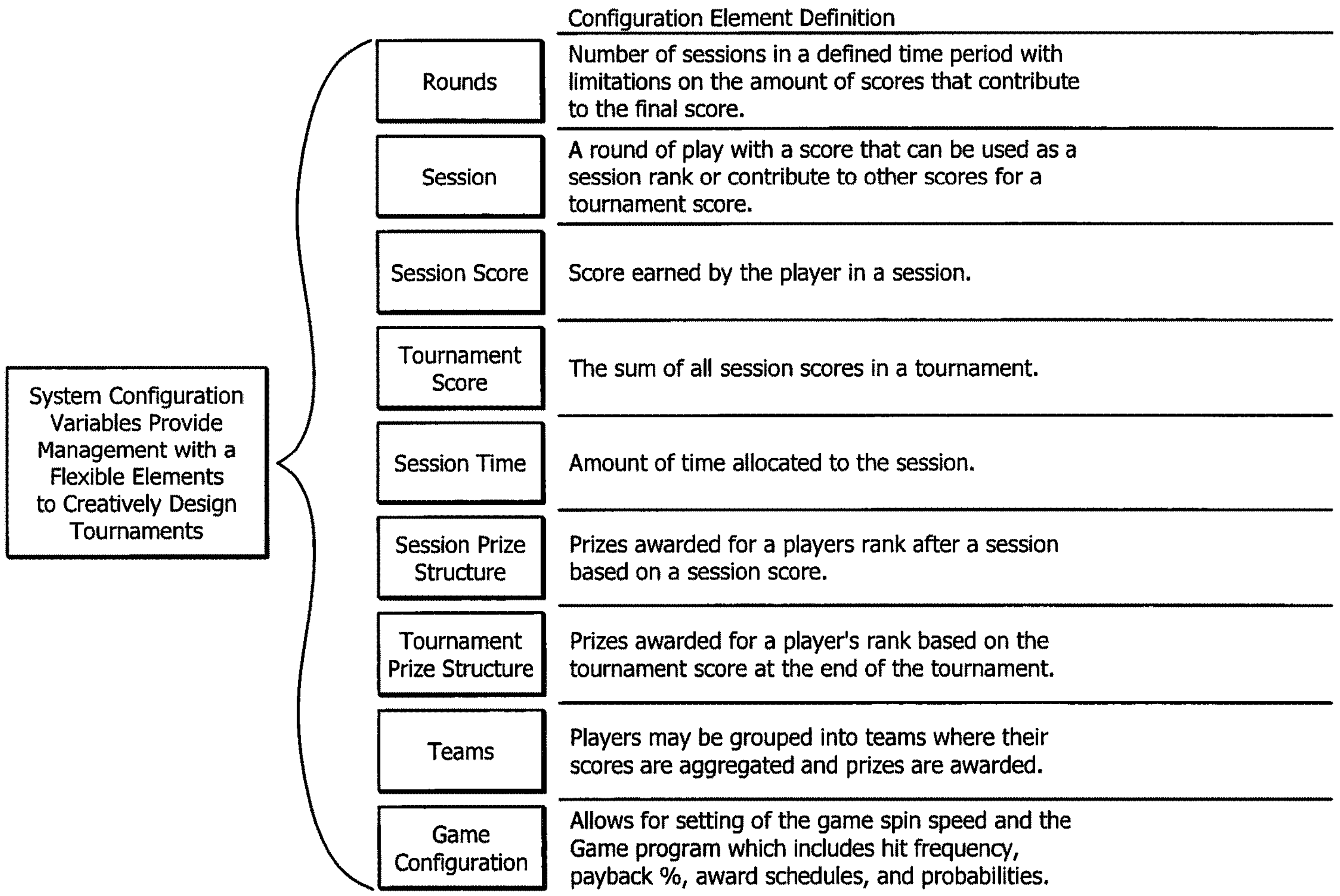
FIG. 5 is a diagram describing embodiments of system configuration variables for slot tournaments according to the concepts described herein.

Referring now to FIG. 5, an example of embodiments of tournament configuration variables that are controllable by the present system are shown and described. The system allows configuration of all aspects of a slot or gaming machine tournament. These include allowing the tournament operator to configure the session play, the number of rounds, the session prize structure, the tournament prize structure, and team structure associated with a particular tournament.

Aspects of the game configuration itself can also be modified to fit the tournament parameters desired by the operator. Such game configuration elements include spin speed, payback frequency, award schedules, probabilities, and perks that are awarded by the game. Since the tournament prize structure is set, the game itself can be adjusted to have more frequent and more valuable award probabilities to make the tournament play more exciting than traditional game play.

Figure 6:
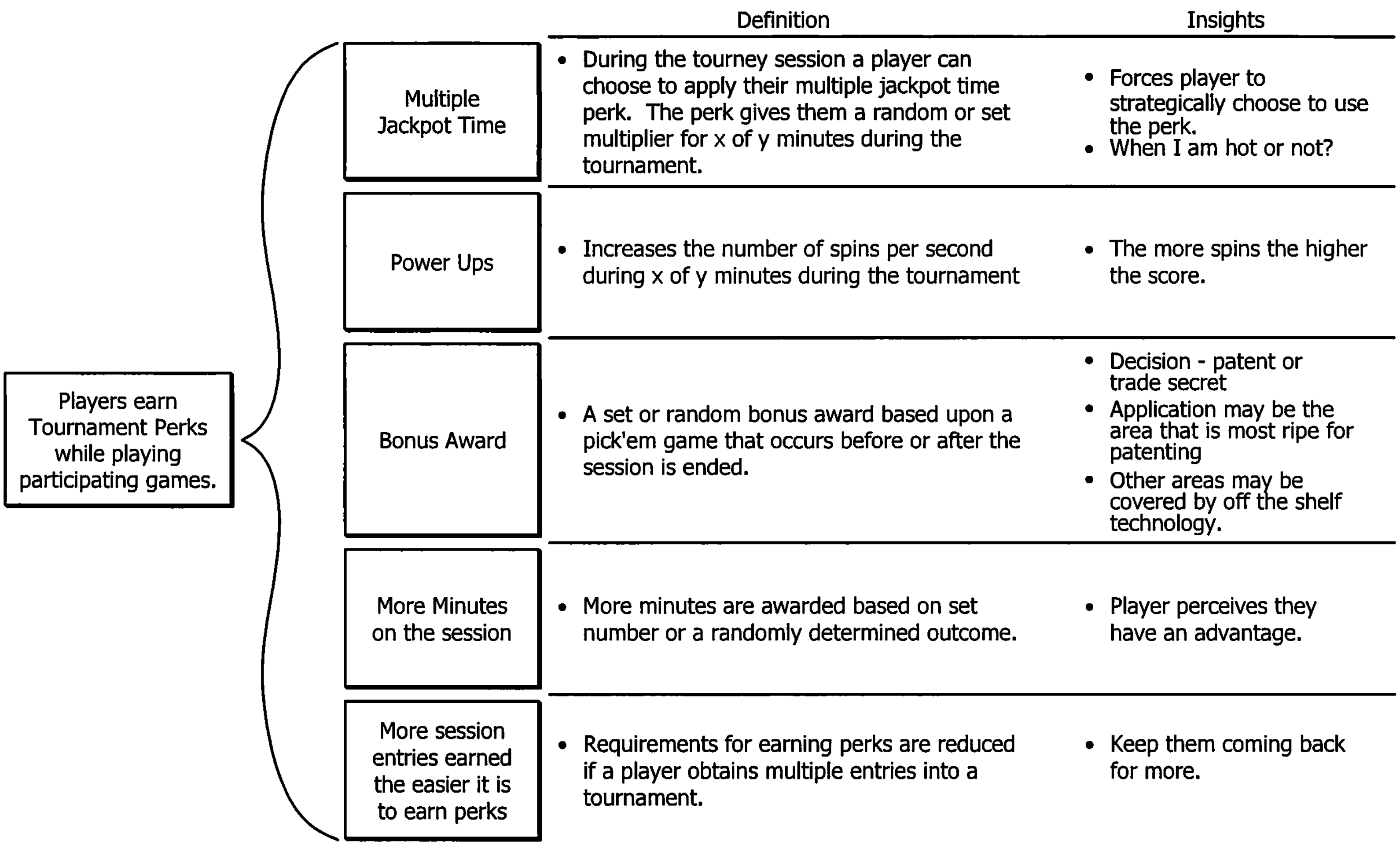
FIG. 6 is a diagram describing embodiment of perks that can be awarded to players of slot tournaments according to the concepts described herein.

Referring now to FIG. 6, an example of embodiments of the perk system of the system is shown. The application allows the accumulation of non-tournament game perks, as through a player's casino loyalty account or similar consumer accounts, that enhance a player's perceived or real opportunity to win in a slot tournament. These perks can be awarded via a system connecting to a slot machine via a VSMIB or a connection directly to the internal integrated board that traditionally controls the presentation on the slot machine. Perks are earned by playing gaming devices with a loyalty card, and are stored in a players account and can be redeemed during the slot tournament game period. Players who play more using their loyalty accounts can earn more perks and increase their odds of winning during the tournament; however their real odds of winning may not change if all players earn the same perks. Conversely, players will have an opportunity to exercise choice regarding the timing of redeeming their tournament perks, which may or may not affect the final outcome.

Casinos can choose where and how perks can be earned. For example, perks can be earned on all gaming devices or a subset of devices and can vary by device and play. In certain embodiments, players can play a slot tournament at any time on a plurality or a subset of gaming devices. Slot tournaments themselves can be synchronous or asynchronous in timing. The player can choose to use their perks in one session of play or over a series of sessions.

Players who have perks and have entered into a slot tournament can anticipate when to use the perks to improve their opportunity to win. In a tournament that has multiple sessions and elimination criteria, the redemption of perks can add a skill element to the game. In addition, with the knowledge that perks are an advantage, players will chase the opportunity to earn them with greater anticipation regarding the redemption.

The nature of the perks offered to players can be any type of offer that would be perceived as a bonus by the player. The casino benefits by awarding a virtual good that has a high perceived value but a low operating cost. This benefit helps the casino to build switching costs with its consumers. While those skilled in the art can identify a wide range of permutations of perks that could be awarded, an example is a player might have a perk that allows them to add 1,000 points to their score. Alternatively, a player could choose for example to apply a 2×, 3×, or 5× multiplier to jackpots earned during a certain number of spins or an amount of time. A player might be able to extend a tournament session from 10 to 15 minutes increasing the number of opportunities to improve their score. Alternatively, a player could have additional playing cards inserted into the deck and the player could choose the cards to be inserted. A player could receive a perk that unlocks additional game content, such as a new bonus round that increases the payout. As a player plays multiple tournament games, a tournament perk may allow them to unlock additional games to choose from to play during the tournament. Those skilled in the art of game design can see a number of ways that a gambling game that is not being played for money as part of a tournament can be altered by the addition of tournament perks. A player may even use points earned via slot play in the casinos loyalty program to buy tournament perks. Tournament perks could be purchased prior to or during the tournament session depending on the game design and goals of the casino. Any other types of perks are well within the concepts described herein. These perks are intended to make the game more exciting for the player and more rewarding for their base casino play.

In addition to gaming machines, tournaments can be played on multiple digital platforms, such as a smart phone, tablet device, or on the internet. Perks could be configured so that they can be earned in or out of the casino. A preferred embodiment contemplates the earning of perks in the casino and redeemed in the casino or on digital devices outside the casino. Tournaments can also be player in or outside of the casino on various digital devices and platforms. Perks could also be offered for sale in and out of the casino.

The system can be configured to provide messages, via email, text, social networks or other mechanism, to players who leave the casino reminding them of the perks they have earned and can redeem. Messages can encourage them to redeem them in specific tournaments at specific times or at a time that is convenient or to notify them that they have tournament perks in their account Their status in a tournament via a leader board can be published via the same digital devices. As a player moves up and down the leader board, messages notify them of their status and motivating them to take action. Their status can be used to motivate them to return to the casino to stay in the action and competing for prizes.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A gaming machine tournament management system for conducting a tournament, comprising:

a plurality of video slot machine interface boards (VSMIBs) respectively coupled to a plurality of gaming machines, the plurality of VSMIBs respectively comprising:

a slot accounting system (SAS) interface configured to couple to an SAS port of a slot computer of a gaming machine, a processor coupled to the SAS interface and configured to collect tournament activity data from the gaming machine in real time, the processor further configured to transmit the tournament activity data over a network, a video capture circuit coupled to a first graphics processing unit (GPU) of the slot computer, said video capture circuit configured to capture game video data from the first GPU, and a second GPU coupled to the video capture circuit and the processor, said second GPU configured to drive a display of the gaming machine based on the game video data and tournament content for the tournament;

a content delivery system connected to the plurality of gaming machines through the plurality of VSMIBs for delivering tournament content to the plurality of gaming machines; and a player game management system connected to the plurality of gaming machines through the plurality of VSMIBs, the player game management system configured to configured to receive respective tournament activity data from the plurality of gaming machines, wherein the player game management system is configured to display the tournament activity data from the plurality of gaming machines on each of the plurality of gaming machines using the plurality of VSMIBs; and wherein the content delivery system and the player game management system are configured to:

provide at least one player in the tournament with perks, and allow the at least one player to redeem the perks during tournament play, the perks providing the at least one player an advantage during a session in the tournament play.

2. The gaming machine tournament management system of claim 1 wherein the perks are earned as a result of game play on the player's casino loyalty account.

3. The gaming machine tournament management system of claim 1 wherein each of the plurality of gaming machines is a slot machine.

4. The gaming machine tournament management system of claim 1 wherein the perks include at least one of multiple jackpot time, power ups, bonus awards, additional session minutes, and additional session entries.

5. The gaming machine tournament management system of claim 1 wherein the tournament management system can set game play characteristics for a tournament.

6. The gaming machine tournament management system of claim 5 wherein the game play characteristics include at least one of spin speed, hit frequency, payback percentage, award schedules and probability tables.

7. The gaming machine tournament management system of claim 1 wherein the each of the plurality of VSMIBs is configured to intercept video information from a respective gaming machine of the plurality of gaming machines and incorporate the content from the content delivery system.

8. The gaming machine tournament management system of claim 7 wherein the plurality of VSMIBs are respectively configured to intercept communications between the gaming machine and peripherals of the gaming machine.

9. The gaming machine tournament management system of claim 8 wherein the peripherals include at least one of a ticket printer, a card reader, a button panel, and a monitor.

10. The gaming machine tournament management system of claim 1 wherein the perks are used to incent players to enter a gaming machine tournament.

11. A method of managing a gaming machine tournament, the method comprising:

connecting a plurality of gaming machines to a tournament management system through a plurality of video slot machine interface boards (VSMIBs), the plurality of VSMIBs respectively comprising a slot accounting system (SAS) interface, a processor, a video capture unit, and a first graphics processing unit (GPU), the SAS interface and the first GPU coupled to the processor, the video capture unit coupled to the first GPU;

respectively coupling the plurality of VSMIBs to the plurality of gaming machines, wherein coupling each VSMIB, of the plurality of VSMIBs, to a gaming machine, of the plurality of gaming machines, comprises:

coupling the SAS interface to an SAS port of a slot computer of the gaming machine, coupling the video capture circuit to a second GPU of the slot computer, and coupling the first GPU to a display of the gaming machine;

collecting, by respective processors of the plurality of VSMIBs, tournament activity data at the plurality of gaming machines in real time;

transmitting the tournament activity data to a player game management system;

capturing, by respective video capture circuits of the plurality of VSMIBs, game video data from the respective GPUs of the plurality of gaming machines;

controlling, by the player game management system, respective displays of the plurality of gaming machines to display respective game video data and the tournament activity data through respective GPUs of the plurality of VSMIBs;

configuring tournament parameters using the tournament management system;

providing, through the VSMIBs, at least one player with perks usable during tournament play; and allowing the at least one player to redeem the perks during tournament play, the perks providing the at least one player an advantage during a session in the tournament play.

12. The method of claim 11 wherein the perks are earned as a result of game play on a casino loyalty account of the player.

13. The method of claim 11 wherein the plurality of gaming machines are slot machines.

14. The method of claim 11 wherein the perks include at least one of multiple jackpot time, power ups, bonus awards, additional session minutes, and additional session entries.

15. The method of claim 11 further comprising setting game play characteristics for a tournament.

16. The method of claim 15 wherein the game play characteristics include at least one of spin speed, hit frequency, payback percentage, award schedules and probability tables.

17. The method of claim 11 wherein the interface with the tournament management system uses a video slot machine interface board.

18. The method of claim 17 wherein the video slot machine interface board intercepts video information from the gaming machine and incorporates content from a content delivery system and also intercepts communications between the gaming machine and peripherals of the gaming machine.

19. The method of claim 18 wherein the peripherals include at least one of a ticket printer, a card reader, a button panel, and monitor.

20. The method of claim 11 further comprising incenting players to enter a gaming machine tournament using the perks.

* * * * *